United States Patent [19]

Fukuda

[11] Patent Number: 4,664,916

[45] Date of Patent: May 12, 1987

[54] METHOD FOR THE PREPARATION OF A FOOD HAVING DESALINATING ACTIVITY

[75] Inventor: Keishi Fukuda, Mihara, Japan

[73] Assignee: Shimizu Kagaku Kabushiki Kaisha, Japan

[21] Appl. No.: 663,126

[22] Filed: Oct. 22, 1984

[30] Foreign Application Priority Data

Jan. 31, 1984 [JP] Japan .................................. 59-15821

[51] Int. Cl.$^4$ .............................................. A61K 35/78
[52] U.S. Cl. .......................... 424/195.1; 424/DIG. 6
[58] Field of Search ........................ 424/195.1, DIG. 6

[56] References Cited

PUBLICATIONS

Chem. Absts., 72:823g, 1970; 69:65391x, 1968; 84:40780v, 1976; 103:10798a, 1985; 88:71778n, 1978; 75:73377n, 1971; 93:192025b, 1980.

*Primary Examiner*—Johnnie R. Brown
*Assistant Examiner*—John W. Rollins, Jr.
*Attorney, Agent, or Firm*—Wyatt, Gerber Shoup, Scobey and Badie

[57] ABSTRACT

The invention provides a desalinating food suitable as an ingredient of diet for dietetic care of patients for whom decrease of the salt ingestion is essential. The inventive desalinating food is prepared by demetallizing the tissue of marine algae by treating with an inorganic acid followed by contacting thereof with an aqueous solution containing potassium ions to effect replacement therewith. The food can adsorb a large amount of sodium ions with simultaneous dispensation of potassium ions in the living body.

5 Claims, No Drawings

METHOD FOR THE PREPARATION OF A FOOD HAVING DESALINATING ACTIVITY

BACKGROUND OF THE INVENTION

The present invention relates to a method for the preparation of a food having desalinating activity. More particularly, the invention relates to a method for the preparation of a food having excellent desalinating activity by the ion exchange with adsorption of sodium ions and release of potassium ions instead taking place when it is in the digestive tract of a living body.

As is well known, one of the motivating factors of hypertension and some other diseases is the overly ingestion of salt, i.e. sodium chloride, so that desalination of foods is the most important and effective dietetic care for the patients suffering from hypertension or renal troubles and those who wish to prevent these diseases. Therefore, these people have been forced to take an unpalatable prescribed diet of an extremely low salty taste. It is therefore a conventional method for the medical treatment of such a patient to administrate the patient with a desalinating agent capable of adsorbing excess of sodium ions which may be an acidic ion exchange resin in the potassium form or a weakly acidic ion exchange resin in the hydrogen form with an object to remove or mitigate the adverse influences caused by the sodium ions when the patient takes an ordinary meal containing salt to give an acceptable taste. These ion exchange resins are of course inherently not edible and extremely unpalatable for the patients. Accordingly, it has been eagerly desired to develop a desalinating agent which in itself is a food of good palatability if not so nutritive.

In some of the Oriental countries, on the other hand, a traditional dietetic care for a patient of hypertension is the utilization of certain marine algae belonging to a class of rather familiar foodstuffs in those countries. The mechanism of the effectiveness of the marine algae as a desalinating agent or rather a desalinating food contributing to the decrease of the blood pressure is presumably the ion exchange activity of the marine algae to adsorb sodium ions in the living body by replacing the sodium ions with the potassium ions contained therein. A problem in the utilization of marine algae is the relatively small ion exchange capacity thereof so that the patient must take quite a large amount of the marine algae every day when a sufficiently high desalinating effect is desired thereof and not all of the patients can take such a large amount of marine algae every day.

SUMMARY OF THE INVENTION

It is therefore an object of the present invention to provide a novel desalinating agent or food prepared from a marine alga but having a much higher ion exchange capacity than the starting raw marine alga and comparable with that of the potassium-form ion exchange resins conventionally used in the medical treatment. The inventor has continued extensive investigations with this object and arrived at a discovery that the ion exchange capacity of a marine alga is greatly increased by subjecting the marine alga to a specific chemical treatment leading to the establishment of the present invention.

Thus, the method of the present invention for the preparation of a food having desalinating capacity comprises treating a marine alga with an aqueous solution of an inorganic acid so as to remove the metallic constituents chemically combined with the tissue of the marine alga and then contacting the thus demetallized marine alga with an aqueous solution containing potassium ions so as to chemically combine the potassium ions with the tissue of the marine alga.

The desalinating food of marine algae origin prepared according to the method of the invention and containing potassium ions has a strong ion exchange activity for replacing sodium ions with potassium ions so that the excessive amount of sodium ions in a living body is adsorbed thereon with release of an equivalent amount of potassium ions instead.

The starting raw material in the inventive method is a marine alga which is not particularly limited to a specific species, genus or family but the so-called brown algae or Phaeophyceae are preferred including the genuses of, for example, Durvillea, Ascophyllum, Laminaria, Eisenia, Ecklonia, Lessonia and Macrocystis.

The first step of the inventive method is the treatment of such a marine alga with an aqueous solution of an inorganic acid. The inorganic acid is preferably hydrochloric, sulfuric or phosphoric acid and the pH of the aqueous acid solution should be 2 or below or, preferably, the concentration of the acid is in the range from 0.1 to 1.0 normal though not particularly limitative thereto. The amount of the aqueous acid solution should be at least 3 times or, preferably, at least 5 times of the marine alga to be treated on the dry weight basis. When the marine alga is dipped and kept standing in the aqueous acid solution with or without agitation, the metallic constituents contained in the raw marine alga by forming chemical linkages such as ionic bonds and chelating bonds are liberated and leached into the acid solution in the form of metallic ions.

The next step is the solid-liquid separation of the thus acid-treated marine alga from the aqueous acid solution which can be readily performed by any conventional method such as decantation, filtration and centrifugal separation. In view of the generally high water-retentivity of marine algae, the method for the solid-liquid separation should be as powerful as possible and, in this regard, centrifugal separation for dehydration is preferred.

The above described solid-liquid separation is followed by washing of the dehydrated marine alga with water to be freed from the metal ions contained in the adhering acid solution as completely as possible. This washing can also be performed without particular difficulties either by a batch-wise process or by a continuous process in running water.

The next step to follow is the contacting of the thus washed marine alga with an aqueous solution containing potassium ions. Thus, the washed marine alga is dispersed in at least 3 times or, preferably, at least 5 times by weight of water on the dry weight and a water-soluble alkaline potassium compound, such as potassium hydroxide, potassium carbonate and the like, is added to the dispersion so that the pH of the dispersion is brought to at least 5 or, preferably in the range from 5 to 8 by neutralizing the acidity of the acid-treated marine alga. In this treatment, the potassium ions are chemically bonded to the functional groups in the marine alga.

It should be noted in this alkali treatment that the alginic acid contained in the marine alga is converted to the potassium salt form which is water-soluble and dissolved in the aqueous phase to cause great difficulties in the further processing such as filtration due to the extremely high viscosity of an aqueous solution of potassium alginate. Even when the filtration is forcibly performed by some means, the product obtained from such a highly viscous medium has a low activity for ion exchange. This difficult problem can be solved by adding ethyl alcohol to the aqueous medium in an amount of at least 30% by weight to cause precipitation of the potassium alginate so that the filtration is no longer accompanied by difficulties. The marine alga material thus obtained is then dried by a suitable method and, if desired, pulverized into a powdery finished product by use of a suitable pulverizing machine.

The desalinating food prepared according to the above described method has a very high ion exchange capacity and is capable of exhibiting a strong desalinating effect in the digestive tract of a living body so that it is useful as an effective ingredient for the dietetic care of the patients of hypertension, renal troubles and the like diseases.

In the following, the method of the present invention is described in further detail by way of examples.

EXAMPLE 1

Into 50 liters of an aqueous hydrochloric acid solution of 0.8 normal concentration were introduced 10 kg of a powder of a marine alga, *Ascophyllum nodosum*, occurring in the north European seacoast, the water content of the powder being 10% by weight, and, after 30 minutes of agitation followed by 30 minutes of standing, the supernatant solution was taken out by syphoning. Water was added to the alga powder to give a total volume of 50 liters and agitation was continued for 30 minutes followed by standing. Such a cycle of washing procedure with water including agitation with added fresh water, standing to settle the alga powder and discard of the supernatant solution was further repeated three times. Thereafter, water was again added to the thus washed alga powder to make a total volume of 50 liters and an aqueous solution of potassium hydroxide of 10% by weight concentration was added to the suspension of the alga powder in water under agitation in such a volume that the pH of the aqueous solution was approximately 7.0. The suspension was further admixed under continued agitation with 50 liters of ethyl alcohol and the alga powder was collected by filtration with a filter cloth followed by centrifugal dehydration for 10 minutes at a velocity of 3000 rpm and by drying for 1 hour in a hot air oven at 100° C.

The thus obtained alga powder was suitable as a food, of which the amounts of sodium ion adsorption thereon and potassium ion dispensation therefrom in a simulated gastric juice were determined by the flame spectrophotometry to give the results that the sodium ion adsorption was 42.3 mg Na/g and potassium ion dispensation was 35.2 mg K/g while the corresponding values for the starting powder of the marine alga were 1.4 mg Na/g and 9.1 mg K/g, respectively.

The above procedure was repeated by use of sulfuric acid and phosphoric acid in place of hydrochloric acid. The sodium ion adsorption and potassium ion dispensation on and from the thus prepared alga powders in the simulated gastric juice were 38.5 mg Na/g and 35.0 mg K/g for the powder prepared with sulfuric acid and 35.0 mg Na/g and 34.2 mg K/g for the powder prepared with phosphoric acid, respectively.

EXAMPLE 2

Substantially the same experimental procedure for the preparation of the treated alga powder and testing thereof as in Example 1 was repeated except that the starting powdered alga was *Laminaria digitata* instead of *Ascophyllum nodosum*. The adsorption of sodium ions on the thus prepared alga powder in a simulated gastric juice was 36.7 mg Na/g and the dispensation of potassium ions therefrom was 30.7 mg K/g.

What is claimed is:

1. A method for the preparation of a food having desalinating activity which comprises the steps of:
   (a) treating the tissue of a brown marine algae selected from the group consisting of the genuses Durvillea, Ascophyllum, Laminaria, Eisenia, Ecklonia, Lessonia and Macrocystis with an aqueous solution of a pH of not greater than 2 containing, at a concentration of from about 0.1 to 1.0N, an organic acid selected from the group consisting of hydrochloric, sulfuric and phosphoric acids to leach out the metallic constituents contained in the tissue of the marine alga
   (b) treating the thus demetallized tissue of marine alga with an aqueous solution containing potassium ions at a pH of from about 5 to 8 to chemically combine potassium ions with the tissue of the marine alga; and
   (c) separating the tissue of the marine alga combined with potassium ions from the aqueous solution containing potassium ions.

2. The method as claimed in claim 1 wherein the amount of the aqueous solution of the inorganic acid is at least three times by weight of the tissue of the marine alga on the dry basis.

3. The method as claimed in claim 1 wherein the aqueous solution containing potassium ions is an aqueous solution of a water-soluble alkaline potassium compound selected from the group consisting of potassium hydroxide and potassium carbonate.

4. The method as claimed in claim 1 wherein the separation of the tissue of the marine alga from the aqueous solution containing potassium ions is performed with admixture of the aqueous solution with ethyl alcohol in an amount of at least 30% by weight of the total amount of the solution.

5. A food having a desalinating activity originating from the tissue of a marine alga in which the metallic constituents originally contained in the tissue have been removed and replaced with potassium ions as prepared according to the method of claim 1.

* * * * *